US011184151B2

(12) United States Patent
Falk (10) Patent No.: US 11,184,151 B2
(45) Date of Patent: Nov. 23, 2021

(54) DEVICES FOR PROVIDING A SET OF CRYPTOGRAPHICALLY SECURED AND FILTERED AND SORTED TRANSACTION DATA SETS OF A BLOCK OF A BLOCKCHAIN (71) Applicant: Siemens Aktiengesellschaft, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/639,842

(22) PCT Filed: Jul. 9, 2018

(86) PCT No.: PCT/EP2018/068475
§ 371 (c)(1),
(2) Date: Feb. 18, 2020

(87) PCT Pub. No.: WO2019/034329
PCT Pub. Date: Feb. 21, 2019

(65) Prior Publication Data
US 2020/0387622 A1 Dec. 10, 2020

(30) Foreign Application Priority Data
Aug. 18, 2017 (EP) ..................... 17186826
Jun. 11, 2018 (WO) .................. PCT/EP2018/065299

(51) Int. Cl.
G06F 16/90 (2019.01)
H04L 9/06 (2006.01)
(Continued)

(52) U.S. Cl.
CPC .............. *H04L 9/0637* (2013.01); *G06F 7/08* (2013.01); *G06F 16/2246* (2019.01);
(Continued)

(58) Field of Classification Search
CPC . G06F 16/239; G06F 21/6227; G06F 16/9027
See application file for complete search history.

(56) References Cited

U.S. PATENT DOCUMENTS 10,616,324 B1 * 4/2020 Kaddoura ................ H04L 43/04
10,726,098 B2 * 7/2020 Brama .................. G06Q 20/065
(Continued)

OTHER PUBLICATIONS

Anderson Ross: "Security Engineering. A Guide to Building Dependable Distributed Systems"; Wiley; Jan. 2001; 2001.
(Continued)

*Primary Examiner* — Eliyah S. Harper
(74) *Attorney, Agent, or Firm* — Schmeiser, Olsen & Watts LLP (57) ABSTRACT Apparatuses for a set of cryptographically protected and filtered and also sorted transaction data records of a link of a blockchain and to a method for forming a set of the sorted transaction data records is provided. One aspect is an apparatus for providing a set of cryptographically protected and filtered transaction data records from a set of integrity-checked and semantically sorted transaction data records of a link of a blockchain, which link is formed in particular using the method of providing at least one such link of a blockchain and coupling to a filtering device that ascertains the set of filtered transaction data records from the set of checked and semantically sorted transaction data records of the blockchain by using a filter criterion, and outputting the ascertained set of filtered transaction data records.

11 Claims, 4 Drawing Sheets (51) Int. Cl.
  *G06F 16/23*    (2019.01)
  *G06F 16/901*   (2019.01)
  *G06F 7/08*     (2006.01)
  *G06F 21/60*    (2013.01)
  *G06F 16/22*    (2019.01)
  *G06F 16/28*    (2019.01)
  *G06F 21/62*    (2013.01)
  *H04L 9/32*     (2006.01)

(52) U.S. Cl.
  CPC ...... *G06F 16/2365* (2019.01); *G06F 16/2379* (2019.01); *G06F 16/28* (2019.01); *G06F 16/9027* (2019.01); *G06F 21/602* (2013.01); *G06F 21/6227* (2013.01); *H04L 9/0643* (2013.01); *H04L 9/3239* (2013.01); *H04L 2209/38* (2013.01)

(56) References Cited

U.S. PATENT DOCUMENTS

| | | | | |
|---|---|---|---|---|
| 2017/0013047 | A1* | 1/2017 | Hubbard | H04L 67/22 |
| 2017/0331810 | A1* | 11/2017 | Kurian | H04L 9/3213 |
| 2017/0344435 | A1* | 11/2017 | Davis | G06F 16/9535 |
| 2017/0344987 | A1* | 11/2017 | Davis | G06F 16/2255 |
| 2018/0165758 | A1* | 6/2018 | Saxena | G06Q 30/02 |
| 2018/0255090 | A1* | 9/2018 | Kozloski | H04L 67/02 |
| 2018/0359089 | A1* | 12/2018 | Innes | G06Q 50/01 |
| 2019/0026685 | A1* | 1/2019 | Chappell | G06Q 30/0631 |
| 2019/0034465 | A1* | 1/2019 | Shimamura | H04L 9/3239 |

OTHER PUBLICATIONS

Yong Yuan et al: "Towards blockchain-based intelligent transportation systems", 2016 IEEE 19th International Conference on Intelligent Transportation Systems (ITSC), IEEE, pp. 2663-2668, XP055515223, DOI: 10.1109/ITSC.2016.7795984; sumary pp. 2664, right column, line 13—pp. 2666, left column, line 29; Figures 2,3; 2016.

Antonopoulos Andraes M: "Mastering Bitcoin—Unlocking Digital Cryptocurrencies", O'Reilly Media, Beijing Cambridge Farnham Köln; Sebastopol Tokyo, XP055306939, ISBN: 978-1-4493-7404-4, pp. 113, 123, 158, 179-182; the whole document; 2014.

Luu Loi et al: "SmartPool: Practical Decentralized Pooled Mining", IACR, International Association for Cryptologic Research; XP061023749 +++ This paper is included in the Proceedings of the 26th USENIX Security Symposium, Aug. 16-18, XP055502980, gefunden im Internet: URL:https://www.usenix.org/system/files/conference/usenixsecurity17/sec17-luu.pdf, gefunden am Aug. 29, 2018, summary; left column, line 35—pp. 10, left column, line 6, figure 3; 2017.

https://en.wikipedia.org/wiki/Blockchain ; Stand: Dec. 3, 2019; 2019.

The Ethereum Book Project/Mastering Ethereum https://github.com/ethereumbook/ethereumbook, Status: Oct. 24, 2017; 2017.

Baird Leemon: "The Swirlds Hashgraph Consensus Algorithm: Fair, Fast, Byzantine Fault Tolerance", Swirlds Tech Report SWIRLDS-TR-2016-01; 2016.

Needham Roger M et al: "Using encryption for authentication in large networks of computers", ACM: Communications of the ACM, vol. 21, No. 12, Dec. 1978; 1978.

Henning Diedrich: "Ethereum: Blockchains, Digital Assets, Smart Contracts, Decentralized Autonomous Organizations", CreateSpace Independent Publishing Platform; 2016.

Baird Leemon: "Overview of Swirlds Hashgraph", Swirlds; 2016.

Blockchainhub: "Blockchain Oracles", https://blockchainhub.net/blockchain-oracles/; 2018.

https://blog.ledger.co/hardware-oracles-bridging-the-real-world-to-the-blockchainca97c2fc3e6c#.lu511vbrd.

PCT International Search Report and Written Opinion of International Searching Authority dated Nov. 2, 2018 corresponding to PCT International Application No. PCT/EP2018/068475 filed Jul. 9, 2018.

Cai, Chengjun et al.: "towards trustworthy and private keyword search in encrypted decentralized storage"; IEEE ICC 2017 Communication and Information Systems Security Symposium.

Japanese Office Action dated Jun. 1, 2021 for Application No. 2020-508984.

* cited by examiner

DEVICES FOR PROVIDING A SET OF CRYPTOGRAPHICALLY SECURED AND FILTERED AND SORTED TRANSACTION DATA SETS OF A BLOCK OF A BLOCKCHAIN

CROSS-REFERENCE TO RELATED APPLICATIONS

This application is a national stage entry of PCT Application No. PCT/EP2018/068475, having a filing date of Jul. 9, 2018, which claims priority to both PCT/EP2018/065299, having a filing date of Jun. 11, 2018, and European Patent Application No. 17186826.8, having a filing date of Aug. 18, 2017, the entire contents all of which are hereby incorporated by reference.

FIELD OF TECHNOLOGY

The following relates to devices for providing a set of cryptographically protected and filtered and sorted transaction datasets of a block of a blockchain, and to a method for forming a set of sorted transaction datasets and to an associated communication network arrangement and to an associated computer program product.

BACKGROUND

A large number of transactions of different types are thereby contained in the blockchain. If a blockchain is used for industrial applications, for example to control a smart energy grid, nodes of the network have to process a multiplicity of transactions that are irrelevant to them.

Blockchain technology or distributed ledger technology is at present a technology that is subject to intense discussion. It is described inter alia at https://en.wikipedia.org/wiki/Blockchain (database).

Figure 1:
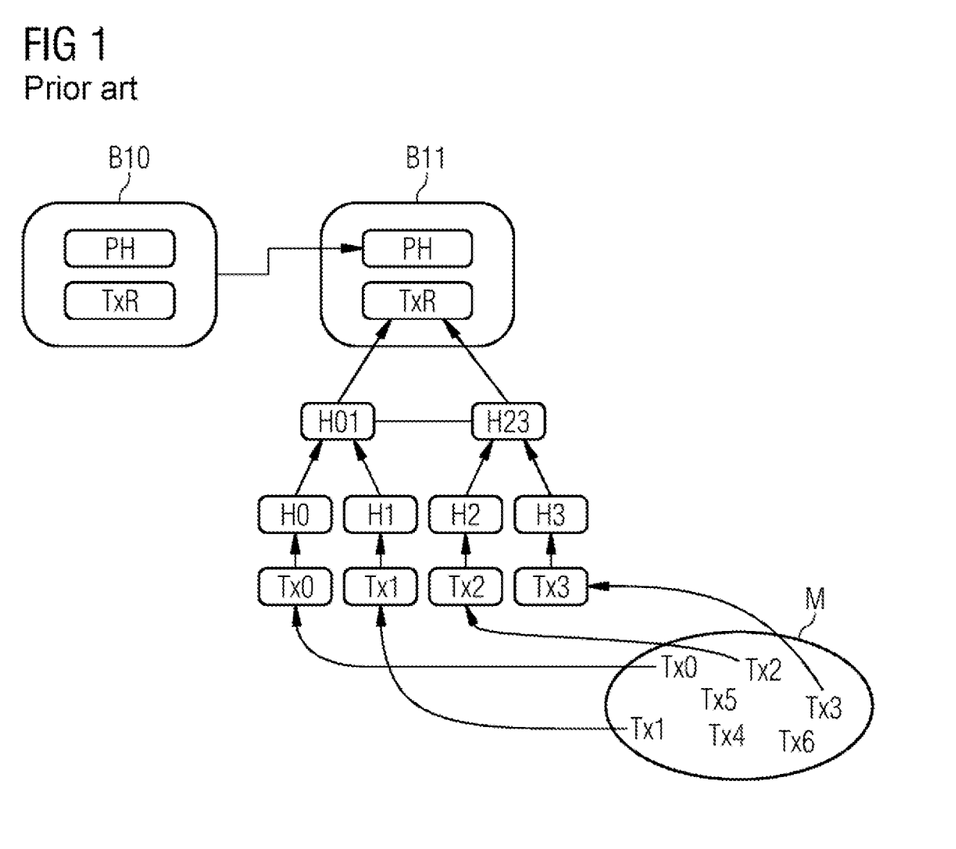
FIG. 1 shows a form of a blockchain according to the prior art.

FIG. 1 shows one example of such a blockchain. A blockchain is generally understood to mean a database whose integrity (security against subsequent manipulation) is ensured by storing the one-way function value PH, also called hash value, of the preceding dataset or block B10 in the respective following block B11, that is to say by cryptographic chaining. The protection is given by a multiplicity of trusted nodes BCN, illustrated by way of example in FIG. 3, in a blockchain network N that performs what is known as mining or validation of blocks. In the network of nodes participating in a blockchain, a new block for example B11 is formed at regular intervals, for example every 10 minutes, and in the process the hash value PH of an existing block is stored therewith. In this case, a predefinable number, in the example 4, of transactions for example Tx0, Tx1, Tx2 and Tx3 are selected from a set M of transactions for example Tx0, Tx1, Tx2, Tx3, Tx4, Tx5 and Tx6 and are appended in a hash tree in the form of leaves in any desired order, at best a syntactic order numbered from 0 to 3. The use of a Merkle tree or Patricia tree is conventional for example as hash trees. The root node TxR of such a hash tree is anchored in a block for example B11.

Transactions Tx0, Tx1, Tx2, Tx3 are no longer able to be changed without being noticed once they arise in the blockchain. The validity or the integrity of transactions to be stored in the block is checked in this mining process. The transaction is able to be executed by way of a transaction dataset. A transaction is understood to mean a reciprocal transmission of virtual or real goods or of a payment (for example by way of Bitcoin or Ethereum) or other information from a sender to a receiver. In the case of Bitcoin, a relatively simple stack-based runtime environment is used in order to check the reliability of a transaction. A transaction in this case comprises the checksum for checking the validity of the transaction. The blockchain platform Ethereum supports a freely programmable runtime environment, such that the program code of a blockchain is able to be created flexibly. In this case, for example, business logic is stored in the transaction dataset and thus in the blockchain or in a blockchain infrastructure node as program code. In this sense, the transaction to be executed is stored in a (chain) block of the blockchain. In this connection, it is accordingly barely possible to draw a distinction between the transaction to be executed and the transaction dataset that is configured for the execution of the transaction.

In the case of blockchains, it is possible for some nodes to completely validate a block, that is to say check all of the transactions of a block. Since this is burdensome, simple validation nodes that validate only individual transactions are also conceivable. To this end, they should in each case comb through and check the path through the hash tree of the transactions in question.

In addition to a mining process as proof of work, alternatives are also known, in particular a proof of stake, in which a block is confirmed by a pseudo-randomly but deterministically selected blockchain node, or an access-controlled blockchain (permissioned blockchain). A blockchain-protected and thus cryptographically protected transaction dataset generally comprises program code. The term "smart contract" is understood to mean a program code in which conditions may be defined at the time of creation and evaluated at its runtime, such that particular transactions of a certain (monetary) amount to one particular or several particular receivers may or may not be performed.

One object of embodiments of the present invention is to provide methods and devices that allow efficient and improved processing of those transactions by the nodes that are relevant to the nodes.

SUMMARY

Unless specified otherwise in the following description, the terms "perform", "calculate", "computer-assisted", "compute", "establish", "generate", "configure", "reconstruct", and the like preferably relate to operations and/or processes and/or processing steps that change and/or generate data and/or convert the data into other data, wherein the data may be represented or be present in particular in the form of physical variables, for example in the form of electrical impulses. The expression "computer" should in particular be interpreted as broadly as possible in order in particular to cover all electronic devices having data processing properties. Computers may thus for example be personal computers, servers, programmable logic controllers (PLCs), hand-held computer systems, pocket PC devices, mobile radio devices and other communication devices able to process data in a computer-assisted manner, processors and other electronic data processing devices.

"Computer-assisted" in connection with embodiments of the invention may be understood to mean for example an implementation of the method in which in particular a processor executes at least one method step of the method.

A processor in connection with embodiments of the invention may be understood to mean for example a machine or an electronic circuit. A processor may be in particular a main processor (central processing unit, CPU), a microprocessor or a microcontroller, for example an application-specific integrated circuit or a digital signal processor, possibly in combination with a storage unit for storing program commands, etc. A processor may also be for example an IC (integrated circuit), in particular an FPGA (field-programmable gate array) or an ASIC (application-specific integrated circuit), or a DSP (digital signal processor) or a graphics processor GPU (graphic processing unit). A processor may also be understood to mean a virtualized processor, a virtual machine or a soft CPU. It may also be for example a programmable processor that is equipped with configuration steps for executing the method according to embodiments of the invention or is configured by way of configuration steps such that the programmable processor implements the features according to embodiments of the invention of the method, the component, the modules or other aspects and/or partial aspects of embodiments of the invention.

A "storage unit" or "storage module" and the like in connection with embodiments of the invention may be understood to mean for example a volatile memory in the form of working memory (random access memory, RAM) or a permanent memory such as a hard drive or a data carrier.

A "module", "means", "apparatus" and the like in connection with embodiments of the invention may be understood to mean for example a processor and/or a storage unit for storing program commands. By way of example, the processor is specifically configured so as to execute the program commands such that the processor executes functions in order to implement or perform the method according to embodiments of the invention or a step of the method according to embodiments of the invention. A module may also be for example a node of the distributed database system that for example performs the specific functions/features of a corresponding module. The respective modules/means/apparatuses may also for example be designed as separate or stand-alone modules/means/apparatuses. For this purpose, the corresponding modules/means/apparatuses may for example comprise further elements. These elements are for example one or more interfaces (for example database interfaces, communication interfaces for example network interface, WLAN interface) and/or an evaluation unit (for example a processor) and/or a storage unit. Data may for example be exchanged (for example received, transmitted, sent or provided) by way of the interfaces. Data may for example be compared, checked, processed, assigned or calculated in a computer-assisted manner and/or automatically by way of the evaluation unit. Data may for example be stored, retrieved or provided in a computer-assisted manner and/or automatically by way of the storage unit.

"Comprise", in particular in relation to data and/or information, in connection with embodiments of the invention may be understood to mean for example (computer-assisted) storage of corresponding information or corresponding data in a data structure/dataset (that is for example in turn stored in a storage unit).

"Assign", in particular in relation to data and/or information, in connection with embodiments of the invention may be understood to mean for example computer-assisted assignment of data and/or information. By way of example, a second item of data is assigned to a first item of data in this regard by way of a storage address or a unique identifier (UID), for example by storing the first item of data together with the storage address or the unique identifier of the second item of data together in a dataset.

"Provide", in particular in relation to data and/or information, in connection with embodiments of the invention may be understood to mean for example computer-assisted provision. Provision is performed for example via an interface (for example a database interface, a network interface, an interface to a storage unit). Corresponding data and/or information may be transmitted and/or sent and/or retrieved and/or received via this interface for example in the course of the provision.

"Provide" in connection with embodiments of the invention may also be understood to mean for example loading or storing, for example of a transaction containing corresponding data. This may for example take place on or from a storage module. "Provide" may also be understood to mean for example transmitting (or sending or transferring) corresponding data from one node to another node of the blockchain or of the distributed database system (or its infrastructure).

"Smart contract process" in connection with embodiments of the invention may be understood to mean in particular execution of a program code (for example control commands) in a process by the distributed database system or the infrastructure thereof.

A "checksum", for example a data block checksum, a data checksum, a node checksum, a transaction checksum, a chaining checksum or the like, in connection with embodiments of the invention may be understood to mean for example a cryptographic checksum or cryptographic hash or hash value that is formed or calculated in particular by way of a cryptographic hash function using a dataset and/or data and/or one or more of the transactions and/or a subregion of the data block (for example the block header of a block of a blockchain or data block header of a data block of the distributed database system or just some of the transactions of a data block). A checksum may be for example a checksum or checksums or hash value or hash values of a hash tree (for example Merkle tree, Patricia tree). It may furthermore also in particular be understood to mean a digital signature or a cryptographic message authentication code. By way of the checksums, it is possible for example to achieve cryptographic protection/protection against manipulation for the transactions and the data(sets) stored therein on different levels of the database system. If for example high security is required, the checksums are for example generated and checked on the transaction level. If less high security is required, the checksums are for example generated and checked on block levels (for example over the whole data block or only over part of the data block and/or some of the transactions).

A "data block checksum" in connection with embodiments of the invention may be understood to mean a checksum that is calculated for example using some or all of the transactions of a data block. A node may then for example check/establish the integrity/authenticity of the corresponding part of a data block by way of the data block checksum. In addition or as an alternative, the data block checksum may in particular also have been formed using transactions of a preceding data block/predecessor data block of the data block. The data block checksum may in this case also in particular be implemented by way of a hash tree, for example a Merkle tree [1] or a Patricia tree, wherein the data block checksum is in particular the root checksum of the Merkle tree or of a Patricia tree or of a binary hash tree. Transactions are in particular secured by way of further checksums from the Merkle tree or Patricia tree (for example using the transaction checksums), wherein the further checksums are in particular leaves in the Merkle tree or Patricia tree. The data block checksum may thus for example secure the transactions by the root checksum being formed from the further checksums. The data block checksums may in particular be calculated for transactions of a particular data block of the data blocks. Such a data block checksum may in particular be incorporated into a data block following the particular data block, in order to chain this following data block for example to its preceding data blocks and in particular thereby to allow the integrity of the distributed database system to be checked. As a result, the data block checksum may for example take over the function of the chaining checksum or be incorporated into the chaining checksum. The header of a data block (for example of a new data block or of the data block for which the data block checksum was formed) may for example comprise the data block checksum.

"Transaction checksum" in connection with embodiments of the invention may be understood to mean a checksum that is formed in particular via a transaction of a data block. Calculation of a data block checksum for a corresponding data block may additionally for example be sped up, since for example previously calculated transaction checksums may be used for this purpose in the same way as for example leaves of a Merkle tree.

A "chaining checksum" in connection with embodiments of the invention may be understood to mean a checksum that indicates or references in particular a respective data block of the distributed database system or the preceding data block of the distributed database system (in particular often called "previous block hash" in the specialist literature) [1]. For this purpose, a corresponding chaining checksum is formed in particular for the corresponding preceding data block. A transaction checksum or the data block checksum of a data block (that is to say an existing data block of the distributed database system) may for example be used as chaining checksum in order to chain a new data block to an (existing) data block of the distributed database system. It is however also possible for example to form a checksum using a header of the preceding data block or using the entire preceding data block and use it as chaining checksum. This may also for example be calculated for several or all preceding data blocks. It is also for example possible for the chaining checksum to be formed using the header of a data block and the data block checksum. A respective data block of the distributed database system however preferably in each case comprises a chaining checksum that was calculated for or relates to a preceding data block, in particular even more preferably the directly preceding data block, of the respective data block. It is also possible for example to form a corresponding chaining checksum even using just part of the corresponding data block (for example preceding data block). It is thereby possible for example to create a data block that comprises an integrity-protected part and an unprotected part. It would thus for example be possible to create a data block whose integrity-protected part is unchangeable and whose unprotected part may also be changed even later on. Integrity-protected should in this case be understood to mean that it is possible to identify a change of integrity-protected data by way of a checksum.

The data that are stored for example in a transaction of a data block may in particular be provided in various ways. Instead of the data, for example user data such as measured data or data/ownership structures of assets, a transaction of a data block may comprise for example only the checksum for these data. The corresponding checksum may in this case be formed in various ways. This may be for example a corresponding data block checksum of a data block (containing the corresponding data) of another database or of the distributed database system, a transaction checksum of a data block containing the corresponding data (of the distributed database system or of another database) or a data checksum that was formed using the data.

In addition, the corresponding transaction may also comprise an indication or a specification of a storage location (for example an address of a file server and specifications as to where the corresponding data may be found on the file server; or an address of another distributed database that comprises the data). The corresponding data could then for example also be provided in another transaction of a further data block of the distributed database system (for example if the corresponding data and the associated checksums are contained in different data blocks). It is however also conceivable for example for these data to be provided via another communication channel (for example via another database and/or a cryptographically secured communication channel).

In addition to the checksum, an additional dataset (for example an indication or a specification of a memory location) may also for example be stored in the corresponding transactions, this in particular specifying a storage location from which the data may be retrieved. This is in particular advantageous in order to keep an amount of data in the blockchain or in the distributed database system as low as possible.

"Security-protected" in connection with embodiments of the invention may be understood to mean for example protection that is achieved in particular by way of a cryptographic method. By way of example, this may be achieved through using the distributed database system to provide or transmit or send corresponding data/transactions. This is preferably achieved by combining the various (cryptographic) checksums, since these interact in particular in a synergistic manner in order for example to improve the security or the cryptographic security for the data in the transactions. In other words, "security-protected" in connection with embodiments of the invention may also in particular be understood to mean "cryptographically protected" and/or "protected against manipulation", wherein "protected against manipulation" may also be referred to as "integrity-protected".

"Chaining (the) data blocks of a distributed database system" in connection with embodiments of the invention may be understood to mean for example that data blocks in each case contain information (for example chaining checksum) that indicates or references another data block or a plurality of other data blocks of the distributed database system [1][4][5].

"Insertion into the distributed database system" and the like in connection with embodiments of the invention may be understood to mean for example that in particular a transaction or the transactions or a data block containing its transactions are transmitted to one or more nodes of a distributed database system. If these transactions are for example validated successfully (for example by the node (s)), these transactions are in particular chained in the form of a new data block to at least one existing data block of the distributed database system [1][4][5]. For this purpose, the corresponding transactions are stored for example in a new data block. This validation and/or chaining may in particular be performed by a trusted node (for example a mining node, a blockchain oracle or a blockchain platform). A blockchain platform may in particular in this case be understood to mean a blockchain as a service, as proposed in particular by Microsoft or IBM. A trusted node and/or a node may in particular in each case store a node checksum (for example a digital signature) in a data block (for example in the data block validated and generated thereby, which is then chained), in order in particular to make it possible to identify the creator of the data block and/or to make it possible to identify the node. In this case, this node checksum indicates which node has for example chained the corresponding data block to at least one other data block of the distributed database system.

"Transaction" or "transactions" in connection with embodiments of the invention may be understood to mean for example a smart contract [4][5], a data structure or a transaction dataset that in particular in each case comprises one of the transactions or a plurality of transactions. "Transaction" or "transactions" in connection with embodiments of the invention may also be understood to mean for example the data of a transaction of a data block of a blockchain. A transaction may in particular comprise a program code that for example executes a smart contract. By way of example, in connection with embodiments of the invention, a transaction may also be understood to mean a control transaction and/or confirmation transaction. As an alternative, a transaction may for example be a data structure that stores data (for example control commands and/or contract data and/or other data such as video data, user data, measured data, etc.).

"Object" in connection with embodiments of the invention may be understood to mean for example devices, electronic devices, electronic components, electronic communication devices (for example a mobile telephone), technical installations, buildings or technical systems, in particular each comprising at least one electronic component whose state is preferably able to be recorded by way of a sensor. In this case, a state change of the state of the object or of the electronic component of the object is likewise in particular able to be recorded by way of the sensor. The state change or the state may in particular also relate to non-electronic components of the object. This may be for example a change in a structure of a building or a deformation of a metal part (for example a frame). The state or the state change are in particular recorded in a computer-assisted manner and/or automatically and/or provided to the control system or to the distributed database system by way of an interface.

"Storing transactions in data blocks", "storing transactions" and the like may in particular be understood to mean directly storing or indirectly storing. Directly storing may in this case for example be understood to mean that the corresponding data block (of the distributed database system) or the corresponding transaction (of the distributed database system) contains the respective data. Indirectly storing may in this case for example be understood to mean that the corresponding data block or the corresponding transaction comprises a checksum and optionally an additional dataset (for example a reference or a specification of a storage location) for corresponding data and the corresponding data are therefore not stored directly in the data block (or the transaction) (that is to say rather only a checksum for these data). When transactions are stored in data blocks, these checksums may in particular be validated, as is explained for example in "insertion into the distributed database system".

A "program code" (for example a smart contract) in connection with embodiments of the invention may be understood to mean for example a program command or a plurality of program commands that are stored in particular in one or more transactions. The program code is in particular executable and is executed for example by the distributed database system. This may be performed for example by way of an execution environment (for example a virtual machine), wherein the execution environment or the program code are preferably Turing complete. The program code is preferably executed by the infrastructure of the distributed database system [4][5]. In this case, a virtual machine is for example created by the infrastructure of the distributed database system.

A "smart contract" in connection with embodiments of the invention may be understood to mean for example an executable program code [4][5] (see in particular definition "program code"). The smart contract is preferably stored in a transaction of a distributed database system (for example a blockchain), for example in a data block of the distributed database system. By way of example, the smart contract may be executed in the same way as explained in the definition of "program code", in particular in connection with embodiments of the invention.

"Proof of work" in connection with embodiments of the invention may be understood to mean for example solving a computationally intensive task that needs to be solved in particular depending on data block content/content of a particular transaction [1][4][5]. Such a computationally intensive task is also referred to for example as a cryptographic puzzle.

A "distributed database system", which may also be referred to for example as a distributed database, in connection with embodiments of the invention may be understood to mean for example a decentralized distributed database, a blockchain, a distributed ledger, a distributed storage system, a distributed ledger, a distributed ledger technology (DLT)-based system (DLTS), a revision-proof database system, a cloud, a cloud service, a blockchain in a cloud or a peer-to-peer database. Various implementations of a blockchain or of a DLTS may also for example be used, such as for example a blockchain or a DLTS that are implemented by way of a directed acyclic graph (DAG), a cryptographic puzzle, a hash graph or a combination of the implementation variants [6][7]. Various consensus methods (consensus algorithms) may also for example be implemented. This may be for example a consensus method by way of a cryptographic puzzle, gossip about gossip, virtual voting or a combination of the methods (for example gossip about gossip in combination with virtual voting) [6][7]. If for example a blockchain is used, then this may be implemented by way of a Bitcoin-based implementation or an Ethereum-based implementation [1][4][5]. A "distributed database system" may also be understood to mean for example a distributed database system at least some of whose nodes and/or devices and/or infrastructure are formed by a cloud. By way of example, the corresponding components are formed as nodes/devices in the cloud (for example as virtual nodes in a virtual machine). This may be achieved for example by way of VM-ware, Amazon Web Services or Microsoft Azure. On account of the high flexibility of the explained implementation variants, partial aspects of the implementation variants may in particular be combined with one another, for example by using a hash tree as blockchain, wherein the blockchain itself may also be formed in a blockless manner.

If for example a directed acyclic graph (DAG) is used (for example IOTA or Tangle), transactions or blocks or nodes of the graph may in particular be connected to one another via directed edges. This in particular means that (all of the) edges (always) have the same direction, similar to the case for example of time. In other words, it is in particular impossible to run or to jump backwards through the transactions or the blocks or the nodes of the graph (that is to say counter to the common same direction). Acyclic in this case in particular means that there are no loops when running through the graph.

The distributed database system may be for example a public distributed database system (for example a public blockchain) or a closed (or private) distributed database system (for example a private blockchain).

If it is for example a public distributed database system, this means that new nodes and/or devices are able to join or be accepted by the distributed database system without proof of authorization or without authentication or without logon information or without credentials. In such a case, the operator of the nodes and/or devices may in particular remain anonymous.

If the distributed database system is for example a closed distributed database system, new nodes and/or devices require for example valid proof of authorization and/or valid authentication information and/or valid credentials and/or valid logon information in order to be able to join the distributed database system or be accepted thereby.

A distributed database system may also for example be a distributed data exchange communication system. This may be for example a network or a peer-2-peer network.

"Data block", which may also be referred to as "block" in particular depending on context and implementation, in connection with embodiments of the invention may be understood to mean for example a data block of a distributed database system (for example a blockchain or a peer-to-peer database) that is formed in particular as a data structure and preferably in each case comprises one of the transactions or a plurality of the transactions. In one implementation, the database (or the database system) may for example be a DLT-based system (DLTS) or a blockchain and a data block may be a block of the blockchain or of the DLTS. A data block may for example comprise information about the size (data size in bytes) of the data block, a data block header (block header), a transaction counter and one or more transactions [1]. The data block header may for example comprise a version, a chaining checksum, a data block checksum, a timestamp, proof of work and a nonce (one-off value, random value or counter that is used for the proof of work) [1][4][5]. A data block may also for example just be a particular storage area or address area of the overall data that are stored in the distributed database system. It is thereby possible for example to create blockless distributed database systems, such as for example the IoT chain (ITC), IOTA, and Byteball. In this case, the functionalities of the blocks of a blockchain and of the transactions are in particular combined with one another such that for example the transactions themselves secure the sequence or chain of transactions (of the distributed database system) (that is to say are stored in particular in a security-protected manner). For this purpose, the transactions themselves may for example be chained to a chaining checksum, preferably by a separate checksum or the transaction checksum of one or more transactions serving as a chaining checksum that is jointly stored in the corresponding new transaction when a new transaction is stored in the distributed database system. In such an embodiment, a data block may also for example comprise one or more transactions, wherein a data block corresponds for example to a transaction in the simplest case.

"Nonce" in connection with embodiments of the invention may be understood to mean for example a cryptographic nonce (abbreviation for: "used only once" [2] or "number used once" [3]). A nonce in particular denotes individual combinations of numbers or a combination of letters that is preferably used just once in the respective context (for example transaction, data transmission).

"Preceding data blocks of a (particular) data block of the distributed database system" in connection with embodiments of the invention may be understood to mean for example the data block of the distributed database system that in particular directly precedes a (particular) data block. As an alternative, "preceding data blocks of a (particular) data block of the distributed database system" may in particular also be understood to mean all of the data blocks of the distributed database system that precede the particular data block. As a result, the chaining checksum or the transaction checksum may for example in particular be formed using only the data block directly preceding the particular data block (or its transactions) or using all of the data blocks preceding the first data block (or their transactions).

A "blockchain node", "node", "node of a distributed database system" and the like in connection with embodiments of the invention may be understood to mean for example devices (for example field devices, mobile telephones), computers, smartphones, clients or participants that perform operations (using) the distributed database system (for example a blockchain) [1][4][5]. Such nodes may for example execute transactions of a distributed database system or its data blocks or insert or chain new data blocks containing new transactions into the distributed database system by way of new data blocks. This validation and/or chaining may in particular be performed by a trusted node (for example a mining node) or just by trusted nodes. A trusted node is for example a node that has additional safety measures (for example firewalls, access restrictions to the node or the like) in order to prevent manipulation of the node. As an alternative or in addition, a trusted node may for example store a node checksum (for example a digital signature or a certificate) in the new data block when a new data block is chained to the distributed database system. It is therefore in particular possible to provide proof that indicates that the corresponding data block was inserted by a particular node or that indicates its origin. The devices (for example the corresponding device) are for example devices of a technical system and/or industrial installation and/or of an automation network and/or of a production installation that are in particular also a node of the distributed database system. In this case, the devices may for example be field devices or be devices in the Internet of Things that are in particular also a node of the distributed database system. Nodes may also for example comprise at least one processor in order for example to execute their computer-implemented functionality.

A "blockchain oracle" and the like in connection with embodiments of the invention may be understood to mean for example nodes, devices or computers that have for example a security module that has for example software protection mechanisms (for example cryptographic methods), mechanical protection apparatuses (for example a closable housing) or electrical protection apparatuses (for example tamper protection or a protection system that deletes the data of the security module in the event of unauthorized use/operation of the blockchain oracle). The security module may for example in this case comprise cryptographic keys necessary to calculate the checksums (for example transaction checksums or node checksums).

A "computer" or a "device" in connection with embodiments of the invention may be understood to mean for example a computer (system), a client, a smartphone, a device or a server that are in each case arranged outside the blockchain or are not a participant in the distributed database system (for example the blockchain) (that is to say do not perform any operations using the distributed database system, or only query it without however performing transactions, inserting data blocks or calculating proof of work). As an alternative, a computer may in particular also be understood to mean a node of the distributed database system. In other words, a device may in particular be understood to mean a node of the distributed database system or else a device outside the blockchain or the distributed database system. A device outside the distributed database system may for example access the data (for example transactions or control transactions) of the distributed database system and/or be actuated by nodes (for example by way of smart contracts and/or blockchain oracles). If for example an actuator or controller of a device (for example a device formed as a node or a device outside the distributed database system) is formed by a node, this may be achieved for example by way of a smart contract that is stored in particular in a transaction of the distributed database system.

The invention claims a method for forming or for generating a set of cryptographically protected and semantically sorted transaction datasets of a blockchain from a set of unsorted transaction datasets, comprising the following steps:

a) forming at least one second block of a blockchain that has been chained or is chained to a first block thereof or a further blockchain,
b) defining at least one search term in the second block or reading at least one previously defined search term that the second block contains,
c) selecting a transaction dataset from the set of unsorted transaction datasets, wherein the selected transaction dataset has been checked for integrity,
d) assigning the selected transaction dataset to the defined or read search term or to one of the defined or read search terms,
e) repeating steps b) to d) until a predefinable number of transaction datasets to be selected is reached and/or the set of unsorted transaction datasets is empty,
f) semantically sorting the selected and assigned transaction datasets on the basis of a predefinable sorting criterion, wherein the assigned search terms are put in an order corresponding to the sorting criterion, and
g) forming the set of cryptographically protected and semantically sorted transaction datasets using the order.

The method is able to be repeated such that it is ultimately possible to form or generate a plurality of blocks beginning with a starting block, which may also be the originating block (Genesis block), wherein each block on its own may accordingly contain a check function of the type mentioned at the outset or sub-functions thereof.

Semantically sorted in connection with embodiments of the invention is understood to mean that the sorting depends on the meaning of a search term. In this case, the semantic sorting may, purely randomly, give the same order as in the syntactic sorting mentioned at the outset in the arrangement of the transactions. This is however generally not the case. The order of the arranged transactions normally turns out differently semantically than it does syntactically or even than it does in unsorted form.

A search term may in this case be formed from a main term and one or more further subordinate sub-terms. A separation symbol, for example ".", may in each case be inserted between the main term and the sub-terms.

In the case of a plurality of defined or read search terms in the second block, these may be arranged in a search tree, preferably a hash tree, wherein the search terms form the nodes of the search tree. A search term may also be arranged hierarchically with the main term in the root node of the search tree as far as a furthest-away subordinate sub-term in the leaf node of the search tree, wherein a separation symbol possibly identifies an edge of the search tree situated between the associated nodes.

The search tree of a block is thus structured on the basis of search terms.

The method is preferably performed in a computer-assisted manner. Unless specified otherwise in the following description, the terms "perform", "calculate", "computer-assisted", "compute", "establish", "generate", "configure", "reconstruct" and the like preferably relate to operations and/or processes and/or processing steps that change and/or generate data and/or convert the data into other data, wherein the data may be represented or be present in particular in the form of physical variables, for example in the form of electrical impulses. The expression "computer" should in particular be interpreted as broadly as possible in order in particular to cover all electronic devices having data processing properties. Computers may thus for example be personal computers, servers, programmable logic controllers (PLCs), hand-held computer systems, pocket PC devices, mobile radio devices and other communication devices able to process data in a computer-assisted manner, processors and other electronic data processing devices.

"Computer-assisted" in connection with embodiments of the invention may be understood to mean for example an implementation of the method in which in particular a processor executes at least one method step of the method.

A processor in connection with embodiments of the invention may be understood to mean for example a machine or an electronic circuit. A processor may be in particular a main processor (central processing unit, CPU), a microprocessor or a microcontroller, for example an application-specific integrated circuit or a digital signal processor, possibly in combination with a storage unit for storing program commands, etc. A processor may also be for example an IC (integrated circuit), in particular an FPGA (field-programmable gate array) or an ASIC (application-specific integrated circuit), or a DSP (digital signal processor) or a graphics processor GPU (graphic processing unit). A processor may also be understood to mean a virtualized processor, a virtual machine or a soft CPU. It may also be for example a programmable processor that is equipped with configuration steps for executing the method according to embodiments of the invention or is configured by way of configuration steps such that the programmable processor implements the features according to embodiments of the invention of the method, the component, the modules, the means or other aspects and/or partial aspects of embodiments of the invention.

A "storage unit" in connection with embodiments of the invention may be understood to mean for example a memory in the form of working memory (random access memory, RAM) or a hard drive.

Means in connection with embodiments of the invention may be understood to mean for example a processor and/or a storage unit for storing program commands. By way of example, the processor is specifically configured so as to execute the program commands such that the processor thereby executes functions in order to implement or perform the method according to embodiments of the invention or a step of the method according to embodiments of the invention.

A blockchain may be used relatively efficiently by nodes, in particular control computers or devices in an industrial IoT (Internet of Things) environment. Real-time behavior is furthermore improved, since less irrelevant information has to be evaluated by these nodes in terms of content. Nevertheless, a common blockchain platform may be used for a multiplicity of different tasks, as a result of which such a blockchain platform is able to be operated efficiently. The blockchain platform may furthermore be executed on different hardware platforms.

A further aspect of embodiments of the invention is a device for providing a set of cryptographically protected and filtered transaction datasets from a set of integrity-checked and semantically sorted transaction datasets of a block of a blockchain that is formed according to the method as claimed in one of the preceding method claims, having:

provision means for providing at least one such block of a blockchain and coupling means for coupling the provision means to a filtering apparatus that determines the set of filtered transaction datasets from the set of checked and semantically sorted transaction datasets of the blockchain using a filtering criterion, and output means for providing the determined set of filtered transaction datasets.

"Providing" in connection with embodiments of the invention may be understood to mean for example creating, loading or storing the transaction dataset on or from a data carrier or platform.

The filtering criterion allows simple filtering of the relevant transactions of a blockchain block. The filtering criterion may be organized such that a node is thus able to process not the entire search tree containing all of the transactions, but is rather able to determine, in a targeted manner, a subtree that contains the transactions relevant thereto.

The filtering criterion may be designed as a kind of "publish-subscribe" criterion. Publish-subscribe protocols, for example MQTT, XMPP, OPC UA PubSub, may be used. In this case, what are known as publisher nodes publish messages, and subscribers, for example devices of a group, receive messages. Search terms identify topics of messages. A publisher (publication node) specifies the topic (or search term) of a message, and subscribers subscribe to the messages about particular topics. The messages are conveyed for example through a message broker. The search terms are in this case generally hierarchically structured, for example using the abovementioned search tree embodiment.

A further aspect of embodiments of the invention is a filtering apparatus suitable for coupling to the provision means of the abovementioned device, characterized by determination means for determining a set of filtered transaction datasets from the set of integrity-checked and sorted transaction datasets of a blockchain using the filtering criterion.

One embodiment of the filtering apparatus makes provision for the filtering criterion to be able to be defined using a further search term and/or at least part of the further search term that is identical to the search term in the provided block of the blockchain or is able to be derived therefrom or is derived therefrom. The further search term may be a topic of the type already explained above (publish-subscribe) that is assigned to a search term in the search tree or is possibly identical thereto. The assignment or derivation may then be performed by way of an assignment table (search term topic).

A further aspect of embodiments of the invention is an access unit comprising a filtering apparatus of the abovementioned type, characterized in that the further search term is able to be defined by a device or a plurality of devices of a group and/or is able to be subscribed to such that the transaction datasets assigned to the search term are subscribed to thereby, and only the blocks of the blockchain that contain the defined and/or subscribed-to transaction datasets are forwarded to the device or the plurality of devices. The access unit is thus a kind of gateway in particular for the devices, preferably for IoT devices (which are often not able to process blockchains). The further search terms or topics may be defined via a user interface (UI). The search terms may also be predefined as projection data for an industrial system. The device may then subscribe to particular further search terms. The transactions that match the further search term are filtered, and only these are executed for the device or made available to the device.

A further aspect of embodiments of the invention is a communication network arrangement comprising the following components:

at least one network node processing a blockchain and that in each case has a device of the abovementioned type, one or more devices that are assigned to a group, at least one filtering apparatus of the abovementioned type or at least one access unit according to the abovementioned type, and comprising a network infrastructure by way of which the components are able to communicate with one another.

A publish-subscribe protocol for example of the type already explained above may be applied in the network infrastructure, in the case of which protocol the filtering apparatus is designed to allow the one or more devices of the group to subscribe to and/or define search terms.

The network infrastructure may be designed such that the components are able to communicate with one another in a wired manner or wirelessly via an air interface. The air interface may be designed in accordance with the GSM, UMT, LTE, 5G, WLAN, Zigbee, Bluetooth or NFC, etc. standard.

The devices, apparatuses and arrangements may be developed in accordance with the developments and embodiments of the abovementioned method.

Furthermore, a computer program (product) containing program commands for a network node processing a blockchain, in particular of the type mentioned at the outset, that is configured by way of the program commands that are suitable for executing the method as claimed in one of the preceding method claims.

A variant of a computer program product (non-transitory computer readable storage medium having instructions, which when executed by a processor, perform actions) containing program commands for configuring a creation device, for example a 3D printer, a computer system or a manufacturing machine suitable for creating processors and/or devices, may additionally be provided.

The uses, devices and computer program (products) may be designed in accordance with the developments/embodiments of the abovementioned method and the developments/embodiments thereof.

A provision device for storing and/or providing the computer program product is furthermore possible. The provision device is for example a data carrier that stores and/or provides the computer program product. As an alternative and/or in addition, the provision device is for example a network service, a computer system, a server system, in particular a distributed computer system, a cloud-based computer system and/or virtual computer system that stores and/or provides the computer program product preferably in the form of a data stream.

This provision takes place for example as a download in the form of a program data block and/or command data block, preferably as a file, in particular as a download file, or as a data stream, in particular as a download data stream, of the complete computer program product. This provision may however also for example take place as a partial download that consists of several parts and is downloaded in particular via a peer-to-peer network or is provided as a data stream. Such a computer program product is read into a system for example using the provision device in the form of the data carrier and executes the program commands such that the method according to embodiments of the invention is executed on a computer or the creation device is configured such that it creates the block and/or the blockchain.

BRIEF DESCRIPTION

Some of the embodiments will be described in detail, with reference to the following figures, wherein like designations denote like members, wherein.

Functionally identical elements are provided with the same reference signs in the figures unless specified otherwise.

DETAILED DESCRIPTION

As already described at the outset, FIG. 1 shows the blocks, for example a first block B10 and a second block B11, of a blockchain. The blocks each comprise a plurality of transactions Tx0 to Tx3. The hash value PH, which is formed depending on the preceding block, may in particular be a cryptographic hash value that is able to be determined for example by way of SHA2-256, SHA2-384, SHA-3, BLAKE2.

Figure 2:
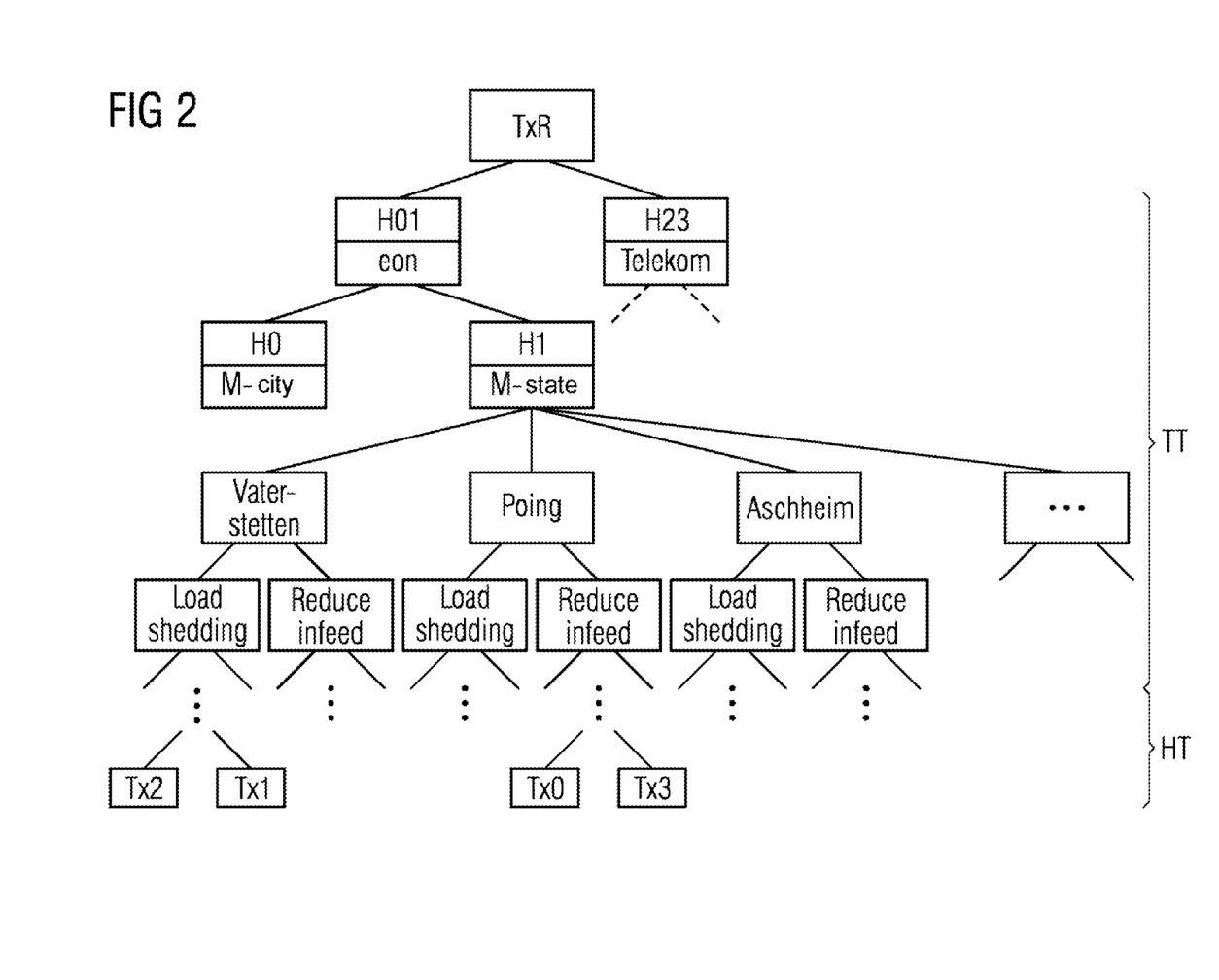
FIG. 2 shows an exemplary embodiment according to embodiments of the invention of one or more transaction dataset(s) incorporated into a block of a blockchain.

FIG. 2 shows an exemplary embodiment of one or more transaction dataset(s) incorporated into a block of a blockchain.

The blocks may in each case comprise a hash (function) value, which may serve as root hash value TxR of a hash tree TT, to form their transactions T. The hash tree, also called search tree, is designed such that it contains both a hash value, for example H01, H23, regarding the next node containing the hash values H0 and H1 of the hash tree TT and at least one search term—as shown in FIG. 2 "eon" or "Telekom". The node containing H0 contains the search term "M-city" and the node containing H1 contains the search term for example as a main term "M-state". Further nodes are depicted proceeding from the node containing H1, containing sub-terms such as for example locations "Vaterstetten", "Poing" and "Aschheim". These nodes also each contain a hash value that is not illustrated in FIG. 2. Possible transaction names as illustrated in FIG. 2 "Load shedding", "Reduce infeed", which as it were represent the root of a following hash tree HT, in the example formed as a Merkle tree, are provided on the leaves of the hash tree TT. The further nodes of the Merkle tree are not illustrated in FIG. 2. The transactions Tx2, Tx1, and Tx0, Tx3 are shown on the leaves of the Merkle tree, these reaching the Merkle tree at the positions shown therein by being semantically sorted from an unsorted set M (see FIG. 1) of transactions. In other words, the hash tree HT (for example Merkle tree, Patricia tree or the like) of a block is sorted, that is to say the transactions of a block are sorted. As a result, all of the transactions that meet a common sorting criterion (search term) are located in one branch of the tree.

This has the advantage that the transactions of a "search term" are able to be checked efficiently. A node BCN (see FIG. 3) may load and check the subregion of the tree HT that contains the transactions of this search term. As a result, it is easy to distinguish between different types of transaction. A node that wishes to evaluate only particular types of transaction is able to process, in a targeted manner, that or those parts of the tree HT containing relevant transactions.

The structure of the tree HT may be fixedly predefined or it may be determined adaptively (per block or over longer periods of time). The structure of the tree HT (that is to say the sorting) may furthermore be published as a transaction in the blockchain. The information is thereby easily able to be evaluated and may possibly be adapted.

It is thereby efficiently possible to evaluate the blockchain transactions even for IoT nodes, for example in the Internet of Things. The transactions regarding a "search term" are accordingly not distributed arbitrarily in the Merkle tree.

Figure 3:
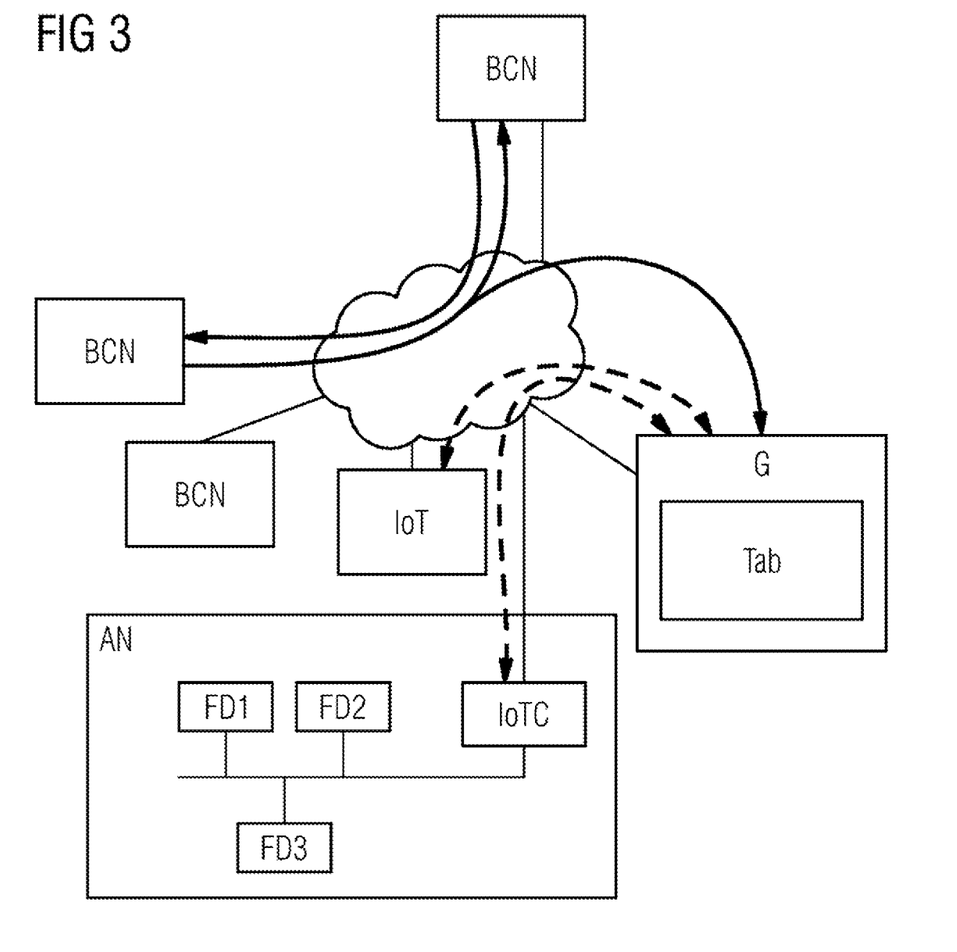
FIG. 3 shows an exemplary embodiment of how embodiments of the invention may be embedded into a network infrastructure.

According to FIG. 3, a device, for example IoT, that is assigned to a group AN, for example to an energy grid, that has subscribed for example to a topic "eon.M-state.Poing.Reduceinfeed", then only the transactions Tx0 and Tx1 are filtered from the semantically sorted Merkle tree and possibly executed for this device.

The topic or the search term in the example of FIG. 2 consists of the main term "eon" and further subordinate sub-terms "M-state" and "Poing" and finally with the transaction reference "Reduceinfeed", with a full stop separation symbol between the terms. Such a separation symbol could identify an edge between the nodes "eon" and the nodes "M-state" in the tree TT. In the same way, all of the edges of the tree TT could be marked with separation symbols.

FIG. 3 shows, by way of example, a communication network arrangement comprising nodes BCN that are able to form a blockchain (distributed database) and that are able to communicate with one another via a network infrastructure N that is indicated by the arrows. The abovementioned device IoT is additionally provided. The group AN comprises for example further devices FD1, FD2, FD3 and an IoT controller IoTC that is connected to the device IoT. A gateway G is also provided in the communication arrangement. This may be implemented for example as a server, appliance or as a cloud-based service (for example a specific app for an industrial platform). The gateway G generates, from a message of a publish-subscribe protocol (for example XMPP, MQTT, AMQP, OPC UA PubSub) that is provided by a publisher and that is assigned to a topic, a blockchain transaction, the eway in the opposite direction, a transaction, which is dnet, and which is confirmed in a block that is validated, provide it as a Pub Sub message to subscribers (devices of a group) as a PubSub message that contains the search term of the blockchain transaction as topic. A device (not illustrated) that filters the transactions by way of an integrated or (remote) coupled filtering apparatus may preferably be implemented in the gateway or else in one of the nodes BCN. The filtering may be performed using the publish-subscribe approach described above. The topic (further search term) determines a filtering criterion using which the filtered transactions or transaction datasets are able to be provided and forwarded to devices, for example IoT, or other nodes BCN.

In this case, there may be a 1:1 assignment of the blockchain search term to the Pub Sub topics (further search terms, see above), that is to say the terms are identical. Blockchain search terms may also be assigned to Pub Sub topics and vice versa via a table Tab that may be integrated into the gateway G. This has the advantage that a blockchain infrastructure is easily able to be used by IoT devices or Industry 4.0 devices, for example FD1, FD2, without the devices themselves having to support the blockchain technology. They are able to access blockchains via PubSub protocols that may be used in the IoT environment. A topic (further search term) may be defined and subscribed to by a device for example via a user interface and/or predefined by a device, for example FD3, as projection data (for example application field: Industry 4.0, system: substation, device x in the substation, region: state of Munich, operator: Eon, etc.). To this end, a transaction is assigned to a topic (for example by a (sorting) attribute). A topic may in this case be structured hierarchically (topic tree), for example topic1.topic2.topic3 (also see above). Namespaces may for example be used as a topic in order accordingly to be able to use the group communication for a particular topic. One example is a virtual power plant (VPP) belonging to Eon in the region of the state of Munich (M-state) that has a separate group for the communication of infeed reductions: VPP.eon.M-state-Poing.reduce infeed (see FIG. 2).

The sorting criterion or the multiplicity of sorting attributes may be predefined explicitly, for example administratively, or determined implicitly depending on the transaction. A hash value of the smart contract or of part of the smart contract may be formed and used as sorting criterion.

In the communication arrangement (see FIG. 3) a node BCN may also be formed as a blockchain oracle. By virtue of what are known as blockchain oracles, nodes that are deemed to be trusted are able to code information about the real world into a blockchain transaction and thus make information from the real world accessible to smart contracts in the blockchain (https://blog.ledger.co/hardware-oracles-bridging-the-real-world-to-the-blockchainca97c2fc3e6c #.1u511vbrd).

Figure 4:
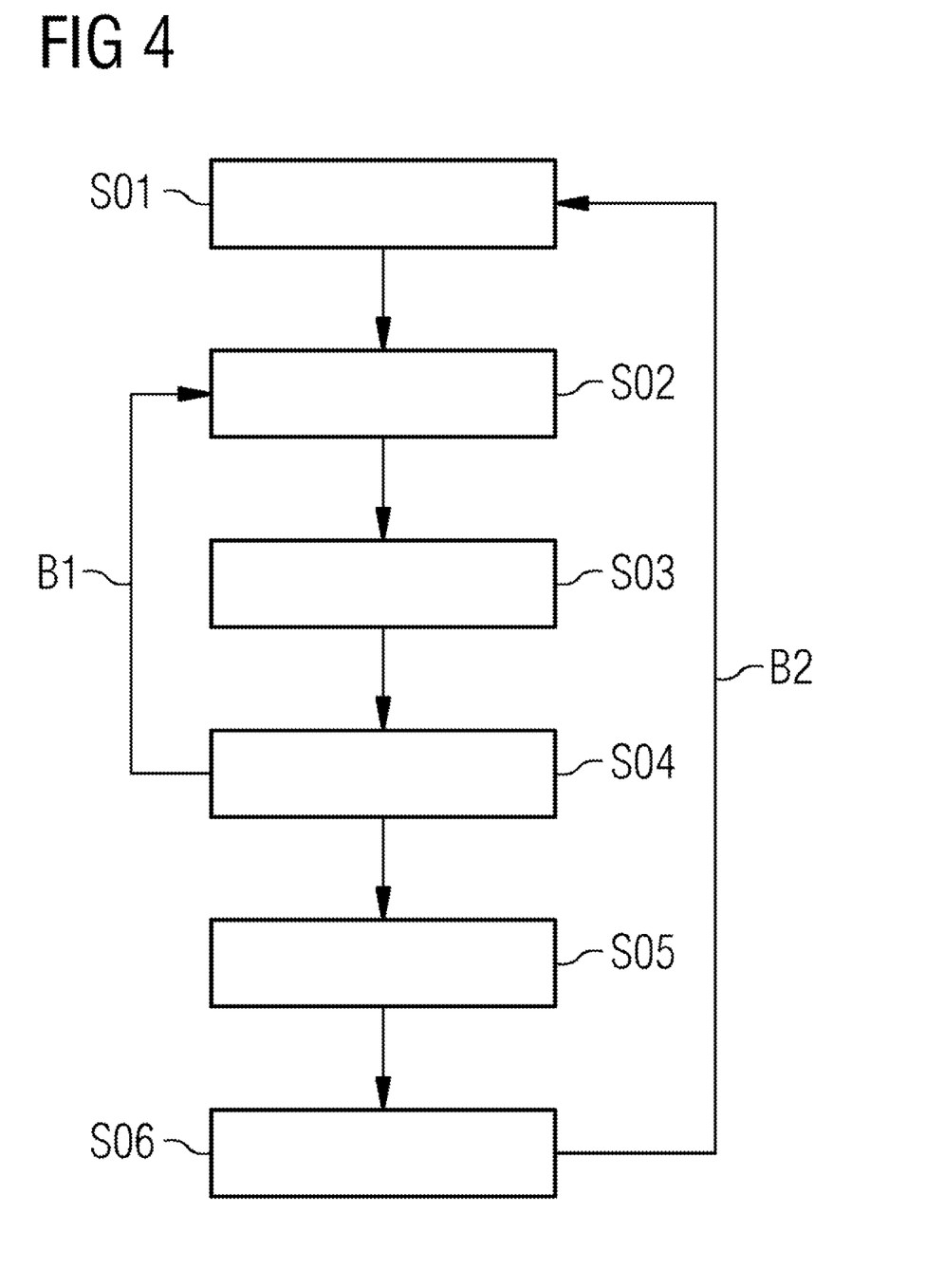
FIG. 4 shows a flowchart of the method according to embodiments of the invention.

FIG. 4 shows a flowchart of the method according to embodiments of the invention. Since a blockchain is a decentralized, distributed database, it is normally possible to communicate with one of the multiplicity of identical blockchain nodes, for example BCN in FIG. 3.

The method in this case comprises the following steps:

S01: forming one or more (second) block(s) of a blockchain that has been chained or is chained to a first block thereof or a further blockchain. As already mentioned above, the first block may be a starting block and/or Genesis block (originating block).

S02: defining at least one search term in the second block or each second block or reading at least one previously defined search term that the second block contains. The search terms have already been explained above;

S03: selecting a transaction dataset from the set M (see for example FIG. 1) of unsorted transaction datasets, wherein the selected transaction dataset has been checked for integrity; and S04: assigning the selected transaction dataset to the defined or read search term or to one of the defined or read search terms;

B1: repeating steps S02 to S04 until a predefinable number of transaction datasets to be selected is reached and/or the set of unsorted transaction datasets is empty;

S05: semantically sorting the selected and assigned transaction datasets on the basis of a predefinable sorting criterion, wherein the assigned search terms are put in an order corresponding to the sorting criterion, and S06: forming the set of cryptographically protected and semantically sorted transaction datasets using the order.

B2: The method is repeated, starting with S01, up to a sufficient length of the blockchain or until a predefinable or predefined number of blocks are formed in the blockchain.

The processes or method sequences described above may be implemented on the basis of instructions that are present in computer-readable storage media or in volatile computer memories (referred to collectively below as computer-readable memories). Computer-readable memories are for example volatile memories such as caches, buffers or RAMs, as well as non-volatile memories such as exchangeable data carriers, hard disks, etc.

The functions or steps described above may in this case be present in the form of at least one set of instructions in/on a computer-readable memory. The functions or steps are in this case not linked to a particular set of instructions or to a particular form of sets of instructions or to a particular storage medium or to a particular processor or to a particular execution scheme, and may be implemented by software, firmware, microcode, hardware, processors, integrated circuits, etc. operating on their own or in any desired combination. In this case, a wide variety of processing strategies may be used, for example series processing using a single processor or multiprocessing or multitasking or parallel processing, etc.

The instructions may be stored in local memories, but it is also possible to store the instructions on a remote system and to access them via a network.

The term "processor", "central signal processing", "control unit" or "data evaluation means" as used here comprises processing means in the broadest sense, that is to say for example servers, universal processors, graphics processors, digital signal processors, application-specific integrated circuits (ASICs), programmable logic circuits such as FPGAs, discrete analog or digital circuits and any desired combinations thereof, including all other processing means known to a person skilled in the art or developed in the future. Processors may in this case consist of one or more devices or apparatuses or units. If a processor consists of a plurality of devices, these may be designed or configured so as to process or execute instructions in parallel or sequentially.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for forming a set of cryptographically protected and semantically sorted transaction datasets of a distributed database system from a set of unsorted transaction datasets, the method comprising:

a) forming at least one second block of a distributed database system that has been chained or is chained to a first block thereof or a further distributed database system;
b) defining at least one search term in the second block or reading at least one previously defined search term that the second block contains;
c) selecting a transaction dataset from a set of unsorted transaction datasets, wherein the selected transaction dataset has been checked for integrity;
d) assigning the selected transaction dataset to the defined or read search term or to one of the defined or read search terms;
e) repeating steps b) to d) until a predefinable number of transaction datasets to be selected is reached and/or the set of unsorted transaction datasets is empty;
f) semantically sorting the selected and assigned transaction datasets on a basis of a predefinable sorting criterion, wherein the assigned search terms are put in an order corresponding to the sorting criterion; and
g) forming the set of cryptographically protected and semantically sorted transaction datasets using the order.

2. The method as claimed in claim 1, wherein in a case of a plurality of defined or read search terms in the second block, these are arranged in a search tree, wherein the search terms form the nodes of the search tree.

3. The method as claimed in claim 1, wherein a search term is formed from a main term and a plurality of sub-terms, in each case separated by a separation symbol.

4. The method as claimed in claim 3, wherein the search term is arranged hierarchically with a main term in a root node of the search tree as far as a furthest-away subordinate sub-term in a leaf node of the search tree and a separation symbol possibly identifies an edge of the search tree situated between the associated nodes.

5. A device for providing a set of cryptographically protected and filtered transaction datasets from a set of integrity-checked and semantically sorted transaction—datasets of a block of a distributed database system that is formed according to the method as claimed in claim 1, the device comprising:
a processor,
wherein the processor is configured for providing at least one such block of a distributed database system,
wherein the processor is configured for coupling the provision means to a filtering apparatus that determines the set of filtered transaction datasets from the set of checked and semantically sorted transaction datasets of the distributed database system using a filtering criterion, and
wherein the processor is configured for providing the determined set of filtered transaction datasets.

6. A filtering apparatus suitable for coupling to the provision means of the device as claimed in claim 1, wherein the processor is configured for determining a set of filtered transaction datasets from the set of integrity-checked and sorted transaction datasets of a distributed database system using the filtering criterion.

7. The filtering apparatus as claimed in claim 6, wherein the filtering criterion is able to be defined using a further search term and/or at least part of the further search term that is identical to the search term in the provided block of the distributed database system or is able to be derived therefrom or is derived therefrom.

8. An access unit comprising a filtering apparatus as claimed in claim 7, wherein the further search term is able to be defined by a device or a plurality of devices of a group and/or is able to be subscribed to such that the transaction datasets assigned to the search term are subscribed to thereby, and only the blocks of the distributed database system that contain the defined and/or subscribed-to transaction datasets are forwarded to the device or the plurality of devices.

9. A communication network arrangement comprising:
at least one network node processing a distributed database system and that in each case has a device as claimed in claim 5,
one or more devices that are assigned to a group,
at least one filtering apparatus as claimed in one of the preceding apparatus claims or at least one access unit as claimed in the preceding access unit claim, and
comprising a network infrastructure by way of which the components are able to communicate with one another.

10. The communication arrangement as claimed in claim 9, wherein a publish-subscribe protocol is able to be applied in the network infrastructure, in which the filtering apparatus is configured to allow the one or more devices of the group to subscribe to and/or define search terms.

11. A computer program product, comprising a computer readable hardware storage device having computer readable program code stored therein, said program code executable by a processor of a computer system to implement the method as claimed in claim 1.

* * * * *